Feb. 3, 1970  YOSHIHIRO NISHIMURA ET AL  3,492,888
STEERING ASSEMBLY FOR ABSORBING IMPACT
Filed Aug. 30, 1967  5 Sheets-Sheet 1
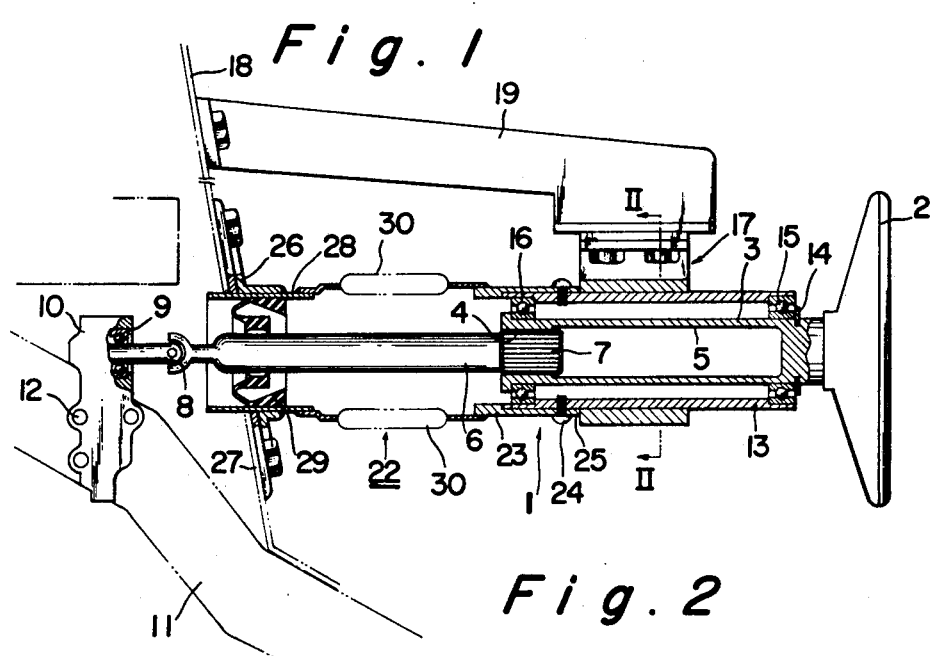
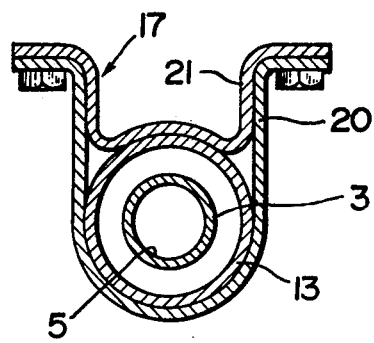

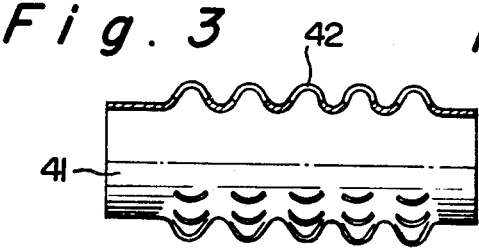
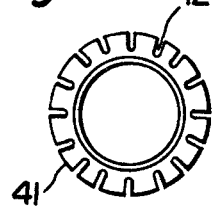
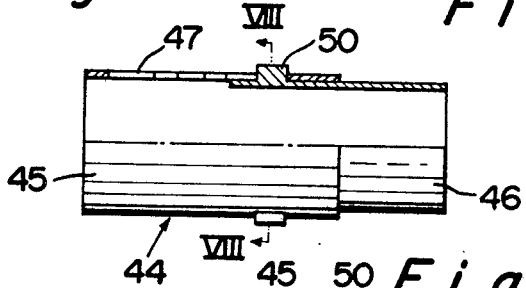
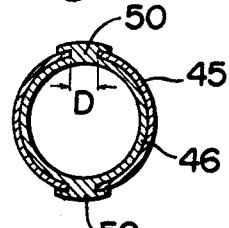
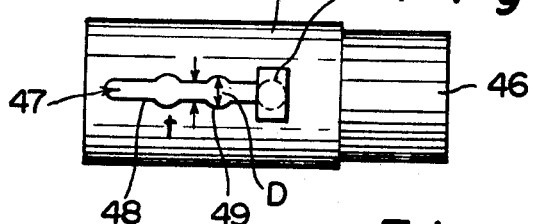
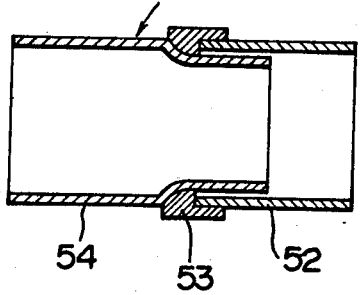

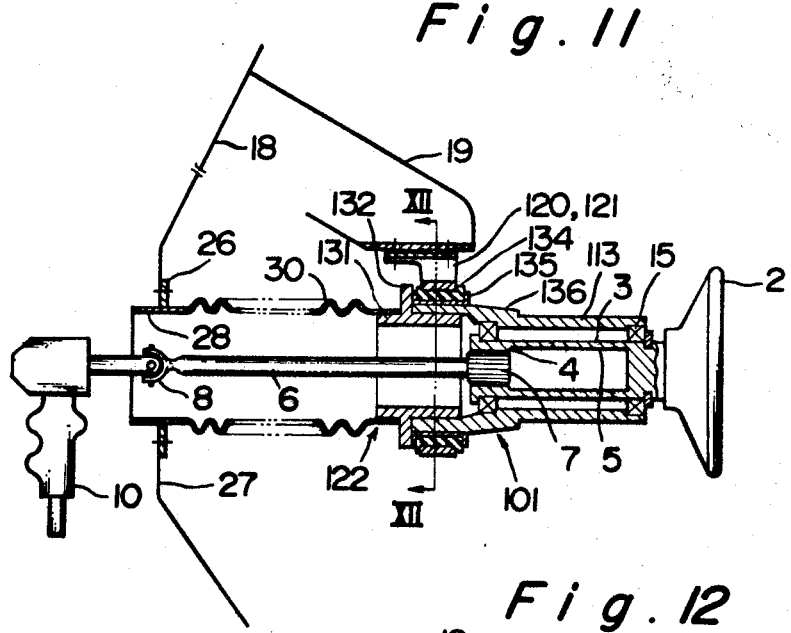
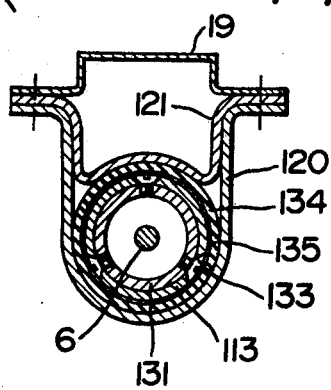

United States Patent Office 3,492,888
Patented Feb. 3, 1970

3,492,888
STEERING ASSEMBLY FOR ABSORBING IMPACT
Yoshihiro Nishimura, Kamakura, and Akihiko Fujiki, Yokohama, Japan, assignors to Nissan Jidosha Kabushiki Kaisha, Yokohama, Japan
Filed Aug. 30, 1967, Ser. No. 664,405
Claims priority, application Japan, Nov. 24, 1966 (utility model), 41/107,309; May 26, 1967 (utility model), 42/43,850
Int. Cl. B62d 1/18
U.S. Cl. 74—492                                    4 Claims

ABSTRACT OF THE DISCLOSURE

A steering assembly for absorbing impact includes an upper steering column shaft axially slidably connected to a lower steering column shaft, an upper jacket tube slidably supported by a portion of the vehicle body, and has an abutment surface to prevent displacement of the upper jacket tube in a direction toward the driver, and a lower jacket tube including plastically deformable impact absorbing means. The impact absorbing means may include a bellows tube, a bellows tube with slots or slit and pin engagement.

---

Figure 5:
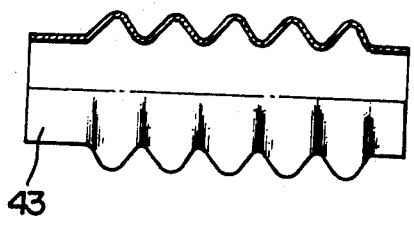

The present invention relates to a steering assembly and more particularly to a steering assembly enabling of absorbing impact imposed on human body in the event of an occurence such as collision.

In case of collision of a vehicle with an obstacle, if the vehicle provides a conventional steering column, there might be a great danger to the vehicle operator by collision of the operator body with the steering column in the event of the ocurrence causing substantial inertia force to the operator and also by rearward displacement of the steering assembly if forward portions of the vehicle is destroyed.

A primary object of the invention is to provide an improved steering assembly to eliminate or at least mitigate the disadvantage or danger.

If the front portions of the vehicle are destroyed, causing displacement of the steering gear box by deformation of chassis portion of the vehicle, or causing deformation of the dash panel by rearward displacement of the engine, the axial force acting to the steering column to cause rearward displacement of the steering column will be too large to be supported or absorbed, so that the impact force will advisably be avoided to prevent from causing any effect or damage to the operator's body.

Another object of the invention is to provide a steering assembly of sample structure, absorbing only the impact energy caused by operator's body, while eliminating to effect the operator's body if the front portions of the vehicle are destroyed.

A further object of the invention is to provide a steering assembly of the type described including a simple and reliable impact absorbing member absorbing impact energy by plastic deformation thereof.

According to the present invention, the foregoing objects are attained by a steering assembly comprising, in combination, a steering column shaft means including an upper and a lower steering column shaft axially slidably engaging each other, a steering wheel secured to the upper end of said upper column shaft, a steering gear box connected to the lower end of the lower column shaft, an upper jacket tube rotatably supporting said upper column shaft and being supported by an upper clamp member so as to be axially slidable in a downward direction only, said upper clamp member being integral with the vehicle body, a lower jacket tube secured to a dash panel which is integral with the vehicle body and being connected to the upper jacket tube at the opposite end thereof, and a plastically deformable impact absorbing means being interposed in said lower jacket tube so that impact energy caused by human body is absorbed thereby.

The steering column assembly acording to the present invention enables to absorb impact energy from the steering wheel caused by the operator body without any reactional effect, while the lower steering column slides almost freely to upper direction causing no effect to other portion of the steering assembly and the operator when the front portions of the vehicle is destroyed.

Still another object of the invention is to provide a steering assembly of the type described supported to the vehicle body through easily slidable means so that the impact energy is ensured to be absorbed only by the plastically deformable member.

Another object of the invention is to provide a steering assembly of the type described having a stopper means to prevent upward movement of the steering wheel even if the dash panel of the vehicle is destroyed.

Figure 6:
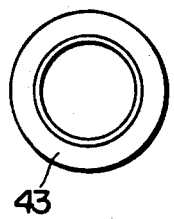
Figure 15:
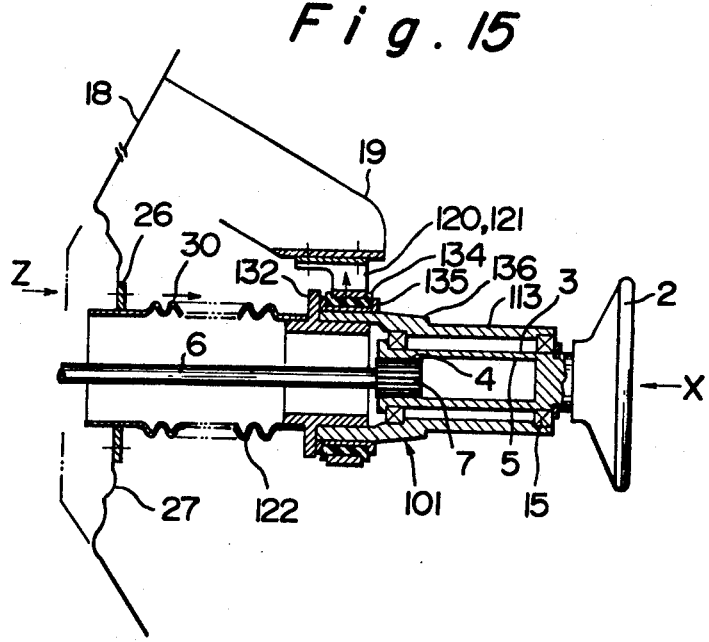
Figure 13:
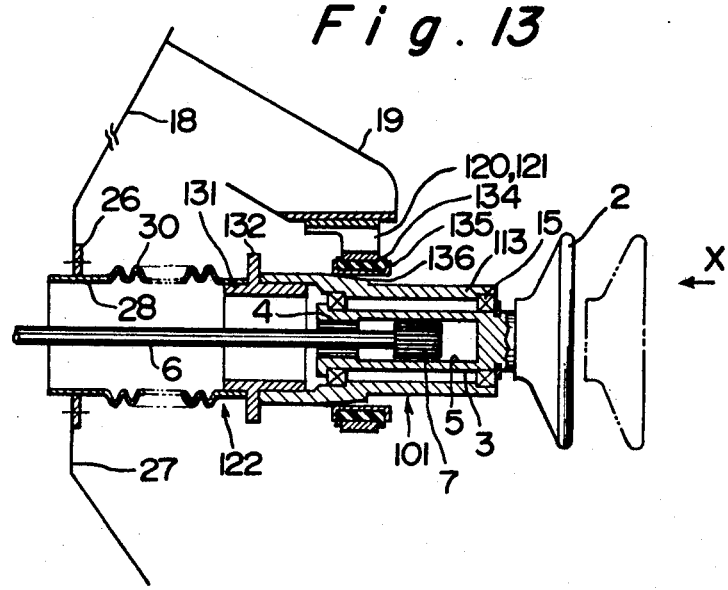
Figure 14:
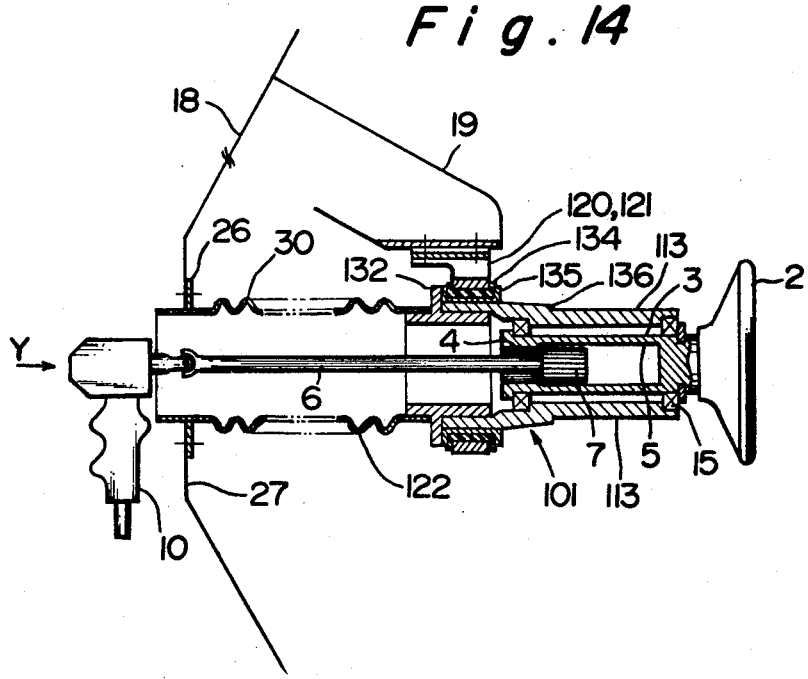

Further and more specific objects, features and advantages of the invention and the manner in which the invention is carried into practice are made apparent in the following detailed description wherein reference is made to the accompanying drawings, in which:

FIG. 1 shows a longitudinal sectional view of one embodiment of the steering assembly according to the invention, FIG. 2 shows a sectional view taken along the line II—II of FIG. 1, FIG. 3 shows a partially sectioned longitudinal view of one embodiment of plastically deformable impact absorbing means which is preferable to use in the apparatus shown in FIG. 1, FIG. 4 shows an end view of the member shown in FIG. 3, FIG. 5 is a view similar to FIG. 3 showing a second embodiment of the impact absorbing member according to the present invention, FIG. 6 shows an end view of the impact absorbing member of FIG. 5, FIG. 7 is a view similar to FIGS. 3 and 5, showing a third embodiment of the impact absorbing member, FIG. 8 shows a sectional view along the line VIII—VIII of FIG. 7, FIG. 9 shows a plan view of the member as shown in FIG. 7, FIG. 10 shows a longitudinal sectional view of a fourth embodiment of the impact absorbing member according to the present invention, FIG. 11 shows a longitudinal sectional view of another embodiment of the steering assembly according to the invention, FIG. 12 shows a sectional view along the line XII—XII of FIG. 11, and FIGS. 13 through 15 are diagrammatic illustrations showing the operations of the steering assembly shown in FIG. 11, in which FIG. 13 represents in case of displacement of the steering wheel by axial force caused by the operator body, FIG. 14 shows in case of destroying chassis portions of the vehicle and FIG. 15 shows in case of destroying the dash panel portion of the vehicle.

Referring now to the drawings and particularly to FIGS. 1 and 2 showing one preferred embodiment of the steering assembly of the present invention, 1 designates generally a steering assembly including a steering wheel 2 secured to an upper steering column shaft 3 having a serrated portion 4 integral with its lower end and forming a hollow portion 5 of sufficient depth. The serrated portion 4 of upper steering column shaft 3 is slidably engaged to a lower steering column shaft 6 through a serrated end portion 7, according to a feature of the invention. The other end of the lower steering column shaft 6 including universal joint means 8, is rotatably mounted through bearing means 9 to a diagrammatically shown steering gear box 10 which is secured to a front portion 11 of vehicle chassis by suitable means such as bolts 12.

The upper steering column shaft 3 is rotatably mounted to an upper jacket tube 13 through a retainer ring 14 and bearings 15 and 16, which bearings are adapted to bear both radial and thrust loads. The upper jacket tube 13 is supported by an upper clamp member 17 secured to a relatively rigid vehicle body portion 18 through a relatively rigid support bracket 19. FIG. 2 shows one embodiment of the upper clamp member 17 comprising two formed plate members 20 and 21 supporting and centering the steering assembly and also allowing axial displacement of the steering assembly.

A lower jacket tube assembly 22 includes a sleeve 23, an impact-absorbing member 30, a lower tube portion 28, and a lower clamp member 26. The sleeve 23 is formed at the upper end of the assembly 22 and secured to the upper jacket tube 13 by suitable securing means such as screws 24 so that a shoulder 25 is formed on the surface of the upper jacket tube 13 engaging to the lower side surface of the stationary upper clamp member 17 forming a stopper means according to a feature of the invention, to prevent upward displacement of the steering assembly 1. The lower jacket tube assembly 22 also includes said lower clamp member 26 to its lower end suitably formed to secure to the dash panel 27 of vehicle body portion, and the tubular portion 28 of which accommodates a dust seal 29 to keep interior portions of the steering assembly from dust.

A portion of the lower jacket tube assembly 22 includes said impact absorbing member 30 suitably secured its both ends to upper and lower members of the lower jacket tube assembly 22, to ensure proper impact energy absorption by plastic deformation of the member 30, according to the invention, if the operator body is thrown forward to the steering wheel 2 in case of collision or the like.

FIGS. 3 through 10 show some embodiments of the plastically deformable impact absorbing member preferable to use as impact absorbing member 30 shown in FIG. 1. An impact absorbing member 41 shown in FIGS. 3 and 4 comprises a bellows tube 41 having many slots 42 in the projected portions of the tube 41. The member 41 will be easily plastically deformed by a predetermined compression load, i.e. impact force, acting axially to the tube and the load deformation characteristic of the tube 41 can be easily determined and selected by depths and numbers of the slots 42.

FIGS. 5 and 6 show another embodiment of a plastically deformable impact absorbing member 43 comprising only a bellows tube or a plain corrugated tube as shown. The member 43 has advantages to be easily manufactured and to provide an interior portion of steering assembly completely dust-proof.

FIGS. 7 through 9 show third embodiment formed as an impact absorbing member 44 comprising an outer tubular member 45 and in inner tubular member 46. The outer tubular member 45 provides a plurality of slots 47, as clearly shown in FIG. 9, each having at least one narrow portion 48 of a width $t$ and at least one wider portion 49 of a diameter D in appropriate distance. A plurality of projections or pins 50 of a diameter D corresponding to the slots 47 protrude from the inner member 46 and are received in the wider portions 49 securing the outer and the inner tubular members 45 and 46 to form impact absorbing means. The outer tubular member 45 and the inner tubular member 46 will slide axially inwardly to each other, by predetermined axial force or impact energy, widening the narrow portions 48 of the slots 47 thus causing plastic deformation of the slots 47 of the outer tube 45, so that the impact energy is absorbed. The advantage of the impact absorbing member 44 is in that, an impact absorbing member having desired characteristics can be easily manufactured from conventional steel tube.

FIG. 10 shows a fourth embodiment formed as a plastically deformable impact absorbing member 51 including an outer tubular member 52 providing a die 53 to cause reduction of sectional area of an inserted inner tubular member 54.

FIGS. 11 through 15 show another embodiment of the steering assembly, according to the invention. The steering assembly 101 shown is basically same construction as the steering assembly 1 shown in FIGS. 1 and 2, so that same reference numerals are used to represent similar parts so as to be more readily understood.

The steering assembly 101 also includs a steering wheel 2, an upper steering column shaft 3, having a serrated portion 4 and a hollow portion 5, and also a lower steering column shaft 6 slidably engaged at the upper end thereof with the serrated portion 4 by a serrated portion 7 and connected at the lower end to a steering gear box 10 through universal joint means 8 as desired. The upper steering column shaft 3 is rotatably supported through bearing means 15 by an upper jacket tube 113 which in turn supported by bracket 19 secured to a relatively rigid vehicle body portion 18. A lower jacket tube assembly 122 includes at its lower end a clamp member 26 secured to the dash panel 27, a tubular portion 28 of the member 26 may accommodate suitable dust seal as shown in FIG. 1.

The lower jacket tube assembly 122 also includes a plastically deformable impact absorbing member 30, such as shown in FIGS. 3 through 10, to its intermediate portion and an upper end sleeve 131. In this embodiment, the upper end sleeve 131 is formed as an inside sleeve to the upper jacket tube 113 and provides an integral flange 132 forming a shoulder abutting to a lower end of clamp members 120 and 121 to prevent upward displacement of the steering wheel assembly 101. The sleeve 131 is secured to the upper jacket tube 113 by suitable means such as screws 133 as shown in FIG. 12.

In the preferred embodiment shown in FIGS. 11 and 12 clamp members 120 and 121 which are formed as two parts to support the upper jacket tube 113 and secured to the bracket 19 providing on their inner surfaces a rubber ring or sheet 134 covered by a suitable plastic sheet 135 which has low frictional coefficient to metal surface, such as Teflon or nylon. The plastic sheet 135 is adhered to the inside surface of the rubber ring 134 to form a packing ring to embrace the upper jacket tube 113. The upper jacket tube provides a tapered portion 136 adjacent to a cylindrical surface supported by the clamp members 120 and 121. The taper of the surface 136 may be preferably about $\frac{1}{10}$. The construction of this embodiment is advantageous in that when an impoct energy applied axially from steering whele 2 in case of collision, the upper portion of the steering wheel assembly 101 easily slides downward by favor of low frictional coefficient between the surface of the plastic sheet 135 and the metal surface of the upper jacket tube 113. In addition, the sliding will be more facilitated by tapered portion 136 provided to the upper jacket tube 113. Consequently, almost the entire impact force applied to the steering wheel 2 by the operator body will be received and absorbed by the pastically deformable impact absorbing member 30 and there may be no danger that the steering assembly 101 is rigidly supported by the clamp members 120 and 121, caused by corrosion or by some other reasons.

Operation of the steering assembly according to the present invention will now be explained more in detail. As the steering assembly 1 shown in FIGS. 1 and 2 and the steering assembly 101 shown in FIGS. 11 and 12 are substantially the same in construction and operation, the following description will be made referring to the second embodiment by way of example.

The steering assembly 1 or 101 controls vehicle in the same manner as conventional steering control system in ordinary operation, the steering force is transmitted from the steering wheel 2 through the upper steering column shaft 3, the inside serration 4 of the shaft 3, the outside serration 7 of the lower steering column shaft 6, the shaft 6, and the universal joint 8 to the steering gears in the steering gear box. In case of collision with an obstruction or such that, if the operator's body is thrown forward, the impact energy is applied to steering wheel 2 through hands or body portions of the operator. As shown in FIG. 13, the impact energy X will force the steering assembly 101 leftward or downward causing relative displacement between the cylindrical surface of the upper jacket tube 113 and the plastic sleeve surface 135, and also between the inside serrated portion 4 of the upper steering column shaft 3 and the outside serrated portion 7 of the lower steering column shaft 6. The plastic sheet 135 has a low frictional coefficient to metal surface as stated above, and further the upper jacket tube 113 provides tapered surface 136 adjacent to the cylindrical supported surface, so that the upper portion of the steering assembly 101 will easily displace downward, because the serrated portions 4 and 7 connecting the upper and lower steering column shafts are easily slidable each other. Thus the impact force is applied to the impact absorbing member 30 through the upper sleeve 131 of the lower jacket tube 122. As the lower end portion 26 of the lower jacket tube is secured to the dash panel of the vehicle, the impact absorbing member 30 will be plastically deformed. When the impact absorbing member 30 is made of the bellows tube as shown in FIGS. 3 and 5, the tube 41 or 43 will be collapsed permanently thus absorb the impact energy without any harmful reaction. When the impact absorbing member 30 is formed by the slot type impact absorbing member 44 as shown in FIGS. 7 through 9, the impact energy will act on projection 50 secured to inner tube 46 so that the projection will displace leftward or downward widening the narrow portions 48 of the slots 47. Thus the slot portions 47 of the outer tube 45 will be permanently deformed absorbing a predetermined amount of the impact energy. Also, when the member 30 is formed by the impact absorbing member 51 as shown in FIG. 10, the impact energy is applied to the die 53 through the outer tube 52, so that the die 53 squeezes the inner tube 54. Thus the diameter of the tube 54 is permanently reduced absorbing the applied impact energy.

In case of collision with an obstruction, if the front portions of the vehicle body is destroyed and the steering gear box 10 is displaced rightward as shown in FIG. 14, the lower steering column shaft 6 will move rightward. The serrated portion 7 at the upper or right end of the lower steering column shaft 6 will move along the inside serrated portion 4 of the upper column shaft 3 into the hollow space 5 thereof, so that the impact energy Y applied to the gear box 10 will not be effected to any parts of the steering assembly 101. Thus the impact energy Y applied through the gear box 10 causes no injury to the operator through steering assembly. Very slight rightward thrust transmitted to the inside serrated portion 4 will be easily withstood by the flange portion 132 of the lower jacket tube and the clamp members 120 and 121 secured to the relatively rigid bracket 19.

It will be apparent that in such a case, the operator's body will be thrown forward to cause downward displacement of the steering assembly 101, as shown in FIG. 13, so that the relative displacement between the upper and lower steering column shafts 3 and 6 will be greater than that as shown in FIG. 14. Consequently the hollow portion 5 of the upper steering column shaft 3 must have sufficient depth to admit such displacement of the lower steering column shaft 6.

FIG. 15 shows another case of collision in that the dash panel 27 itself is deformed by the rearward displacement of the engine body or the like. The impact energy in the direction Z is applied rightward to cause the deformation of the dash panel 27 so that the lower portion 26 of the lower jacket tube 122 is also displaced rightward. The rightward displacement is supported by the flange portion 132 at the upper end of the lower jacket tube 122 abutting to the clamp members 120 and 121 secured to the bracket 19 which in turn secured to the relatively rigid portion 18 of vehicle body. Consequently, the intermediate portion, i.e. the plastically deformable impact absorbing member 30 will be deformed by the impact energy in the direction Z, causing no effect to the upper part of the steering assembly 101. The deformation of the member 30 in this case resembles as deformation thereof as shown in FIG. 13. However, the impact energy in the direction Z caused by such as engine body will be far greater than the impact energy in the direction X caused by the operator body so that the impact absorbing member 30 does not act as an effective impact absorber to the impact energy in the direction Z and acts only as a safety device to prevent the impact energy from causing secondary damage to the upper portion of the steering assembly 101 resulting harmful effect to operator body. In case of the occurrence, there may be the case that operator body also is thrown forward and causes a downward displacement of the steering wheel portion, as shown in FIG. 13, resulting collapse or plastic deformation of the impact absorbing member 30 from both sides. In this case there may be some effect to the deformation characteristic of the impact absorbing member, but far better result will be achieved as compared with that there is no provision preparing to deformation of the dash panel itself.

As described in detail, the steering assembly 1 or 101, according to the invention, eliminates or at least mitigates damage or injury to the vehicle operator in case of collision or the like by simple construction, consequently the invention provides an improved safety device for vehicles.

What we claim is:

1. In a vehicle including a steering gear and a body, a steering assembly for absorbing impact comprising in combination, a lower steering column shaft operably connected at one end thereof to said steering gear and having a serrated portion at the other end, an upper steering column shaft having an internal serrated portion at one end thereof to axially slidably engage said lower steering column shaft and a hollow portion for receiving said serrated portion of the lower steering column shaft, a steering wheel secured to the other end of said upper steering column shaft, an upper jacket tube rotatably supporting said upper column shaft and having an outer cylindrical surface coaxial to said upper column shaft, upper and lower bearings supporting said upper column shaft by said upper jacket tube, a lower jacket tube releasably connected to a portion of the vehicle body at one end and to the upper jacket tube at the opposite end thereof, a shoulder means facing the steering wheel and being connected with said opposite end of said lower jacket tube, an upper clamp member having an inner cylindrical surface coaxially and slidably fitting said outer cylindrical surface of the upper jacket tube and having an annular surface normally abutting said shoulder means, said upper clamp member being secured to a portion of said body, and a bellows tube formed from a cylindrical tube and having curved spaced projections, said bellows tube being included in said lower jacket tube so that when a vehicle operator is thrown against said steering wheel, the upper steering assembly slides axially toward said lower jacket tube to plastically deform said bellows tube and when lower portions of the vehicle are destroyed the lower steering column shaft slides into the hollow portion of the upper steering column shaft and the lower end of the lower jacket tube collapses the bellows tube, thereby preventing the upper steering assembly from being affected by virtue of said abutment between the upper clamp member and the shoulder means of the lower jacket tube.

2. A steering assembly set forth in claim 1, wherein said bellows tube provides a plurality of longitudinal slots at each projected portion thereof.

3. In a vehicle including a steering gear and a body, a steering assembly for absorbing impact comprising in combination, a lower steering column shaft operably connected at one end thereof to said steering gear and having a serrated portion at the other end, an upper steering column shaft having an internal serrated portion at one end thereof to axially slidably engage said lower steering column shaft and a hollow portion for receiving said serrated portion of the lower steering column shaft, a steering wheel secured to the other end of said upper steering column shaft, an upper jacket tube rotatably supporting said upper column shaft and having an outer cylindrical surface coaxial to said upper column shaft, a lower jacket tube secured to a portion of the vehicle body at one end and connected to the upper jacket tube at the opposite end thereof, a shoulder means facing the steering wheel and being located on said opposite end of said lower jacket tube, an upper clamp member having an inner cylindrical surface coaxially and slidably fitting said outer cylindrical surface of the upper jacket tube and having an annular surface normally abutting said shoulder means, said upper clamp member being secured to a portion of said body, and a plastically deformable impact absorbing means being included in said lower jacket tube, said impact absorbing means comprising an outer tubular member and an inner tubular member, said outer tubular member having at least one slot formed in the longitudinal direction of the impact absorbing member, said slot having a narrow portion of a predetermined width and at least one wider portion and at least one projection having corresponding width to engage said wider portion and being secured to said inner tubular member, said each projection engaging one of said wider portions of each said slot, whereby when said outer and inner tubular members are caused to slide axially inwardly toward each other by a predetermined axial force, thus causing widening and plastic deformation of said narrow portion of the slot of the outer tubular member by said projection, the applied impact energy is absorbed.

4. A steering assembly defined in claim 3 in which said clamp means includes a supporting means having a rubber ring covered by a plastic sheet of low frictional coefficeint and being engageable with said outer cylindrical surface of said upper jacket tube.

References Cited

UNITED STATES PATENTS

| 2,836,079 | 5/1958 | Salch | 74—493 |
|---|---|---|---|
| 3,144,918 | 8/1964 | Picton et al. | 188—1 |
| 3,262,332 | 7/1966 | Wight | 74—493 |
| 3,373,629 | 3/1968 | Wight et al. | 74—492 |
| 3,373,630 | 3/1968 | Heurtbise | 74—492 |
| 3,130,991 | 4/1964 | Piragino. | |
| 3,394,612 | 7/1968 | Bogosoff et al. | |
| 3,412,628 | 11/1968 | De Gain | 74—492 |

MILTON KAUFMAN, Primary Examiner

U.S. Cl. X.R.

180—78; 188—1; 280—87